United States Patent
Mason et al.

[19]

[11] Patent Number: 5,940,516
[45] Date of Patent: Aug. 17, 1999

[54] DATA SECURITY METHOD AND SYSTEM

[75] Inventors: Colin Mason; Koichi Maruno, both of Tokyo, Japan

[73] Assignee: Mitsubishi Denki Kabushiki Kaisha, Tokyo, Japan

[21] Appl. No.: 08/732,881

[22] Filed: Oct. 16, 1996

[30] Foreign Application Priority Data

Feb. 14, 1996 [JP] Japan ................................. 8-026864

[51] Int. Cl.⁶ .................................................... H04L 9/00
[52] U.S. Cl. ............................................................ 380/49
[58] Field of Search ..................................... 380/23, 49

[56] References Cited

U.S. PATENT DOCUMENTS

| | | | |
|---|---|---|---|
| 4,677,670 | 6/1987 | Henderson, Jr. ...................... | 380/23 |
| 5,144,665 | 9/1992 | Esserman et al. ...................... | 380/49 |

FOREIGN PATENT DOCUMENTS

| | | |
|---|---|---|
| 63-36634 | 2/1988 | Japan . |
| 63-245035 | 10/1988 | Japan . |
| 3233792 | 10/1991 | Japan . |
| 4286434 | 10/1992 | Japan . |
| 6152586 | 5/1994 | Japan . |
| 7502847 | 3/1995 | Japan . |
| 94 03859 | 2/1994 | WIPO . |

*Primary Examiner*—Salvatore Cangialosi

[57] ABSTRACT

A system for confidential data communication over the Internet and other communications channels between the server machine and client machine is disclosed. The client machine has a main CPU and a main memory and additional CPU and additional memory. The additional CPU and memory in the client machine are linked to the CPU and memory of the server machine via an Internet connection or other communications channel connection. The client and server CPUs and memories thus linked then cooperatively and simultaneously execute a single process while dynamically modifying the encryption and decryption codes as necessary to make decryption by a third party impossible.

27 Claims, 5 Drawing Sheets

DATA SECURITY METHOD AND SYSTEM

BACKGROUND OF THE INVENTION

1. Field of the Invention

The present invention relates to a data security method and a data security system, and relates particularly to a method and system for executing part of the server machine process within a process execution space in the client machine.

2. Description of the Prior Art

The Internet and similar network communications channels 103 are widely used today to link plural communications machines, i.e., communications machines (modems) built in to or connected to a computer. Such networked communications channels 103 typically use one or more server machines commonly accessed by plural client machines, and provide security for client-server communications as shown in FIG. 7.

The server machine 101 and client machine 102 each comprise memory 105 and 109 and a CPU 104 and 108, respectively. The client-server communications interface 130 is within the communications channel 103. The server machine 101 and the client machine 102 also each comprise a security module 120 and 121, respectively. The security modules may be implemented as software used by the respective machine processes and executed by the corresponding CPU in memory, as dedicated hardware, or as a combination of CPU-executed software and dedicated hardware. The security modules are used specifically for encrypting data before transmission between the client and server over some type of communications channel, and then decrypting the received encrypted message.

An example of such a client machine is a personal computer for home shopping; the server machine in this application is a computer providing a shopping service and used to communicate product order numbers and credit card numbers for payment. This data is presently transmitted using the Internet as the communications channel. A typical method for maintaining the confidentiality of customer credit card numbers in this application is to encrypt the credit card number on the client side before transmission via a World-Wide Web (WWW) browser program implementing the Security Socket Layer (SSL) v3.0 specification (a public standard). The server, which has also implemented SSL v3.0, then decrypts the received information.

When an order is generated in this example, the order is issued by a process executed by the client CPU 108, and all messages or credit card numbers requiring confidentiality held in memory 109 are encrypted by the security module 121 before transmission. When the data is received by the server, the data encrypted by the client is decrypted by the server-side security module 120, and is then processed by the order processing program executed by the server CPU 104 and memory 105.

The problem in this system is that the encryption and decryption functions are separately controlled by the client and server machines, and the communications channel itself is not secure. Conceptually, security is provided by wrapping each packet transmitted over the communications channel in a "protective wrapper" achieved by data encryption, and the communications channel itself is not secure.

More specifically, different servers use different communications methods (protocols), and clients accessing different servers require different security software for secure communications with different servers. Furthermore, while individual packets may be secure, these "secure" packets are commonly entrusted to a communications channel that may not be secure.

SUMMARY OF THE INVENTION

The object of the present invention is therefore to provide a data security method and system enabling secure data communications by executing part of the server process in an assigned process execution space within the client machine.

To achieve this object, a data security method according to the present invention for executing part of a server process, originated from a server machine, within a process execution space of a client machine is presented. The method comprises the steps of:

(a) assigning a process execution space in the client machine, (b) calling the server machine from the client machine, (c) transferring a program that is part of the server process from the server machine to said process execution space in the client machine, and (d) executing the program from the server machine in said process execution space in the client machine, such that a part of the server process is executed in said process execution space reserved in the client machine, and the server machine and part of the client machine cooperatively execute a single process.

Furthermore, according to the present invention, a data security system for executing a process of a server machine within a process execution space of a client machine is presented. The system comprises:

(1) a server machine comprising:
  (a) a first CPU; and
  (b) a first memory;

(2) a client machine comprising:
  (a) a second CPU;
  (b) a second memory;
  (c) a third CPU; and
  (d) a third memory;

(3) a first communication channel provided between the server machine and the client machine for communicating between the first CPU associated with the first memory and the third CPU associated with the third memory, and for loading a program from the first memory to the third memory for execution by the third CPU;

(4) a second communication channel provided in the client machine for communicating between said second CPU and third CPU; and (5) a device for preventing interaction between the second and third memories except when controlled by the management program run by the client system.

It is to be noted that the second CPU and the third CPU provided in the client machine can be physically a single CPU, but operated, e.g., in a time sharing manner. Also, the second memory and the third memory can be physically a single memory sharing the memory area for the second and third memories.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiments of the present invention are described below with reference to the accompanying figures.

Embodiment 1

Figure 1:
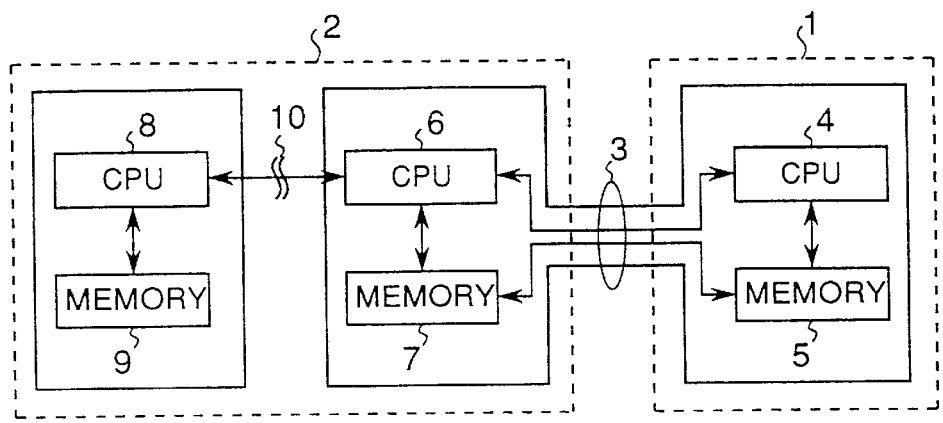
FIG. 1 is a block diagram of a preferred embodiment of a data security system according to the present invention.

FIG. 1 is a block diagram of the preferred embodiment of a data security system according to the present invention. As shown in FIG. 1, one machine 1 comprises a CPU 4 and memory 5, and the other machine 2 comprises two CPUs 6 and 8, and two memories 7 and 9. These two machines 1 and 2 are able to exchange messages with each other via a communications channel 3 of some kind, and may be computing systems of any type. In the preferred embodiment of the invention, however, machine 2 is the client system, and machine 1 is the server system in a typical client-server architecture whereby the server machine 1 provides ("serves") specific services to the client machine 2. The communications channel 3 may include network communications channels such as the Internet, but shall not be so limited and may be any type of communications channel.

The CPUs 6 and 8 of the client machine 2 may be physically discrete machines or may be a single CPU machine used on a time-share basis. Similarly, the memories 7 and 9 may be physically discrete machines or may be a single memory machine clearly separated into discrete operating areas by the control software of the client machine 2. The processes executed by CPU 6 are able to send messages to the processes executed by the other CPU 8 through a strictly controlled interface 10 inside the client machine 2; CPU 8 is likewise able to send messages to CPU 6.

Figure 2:
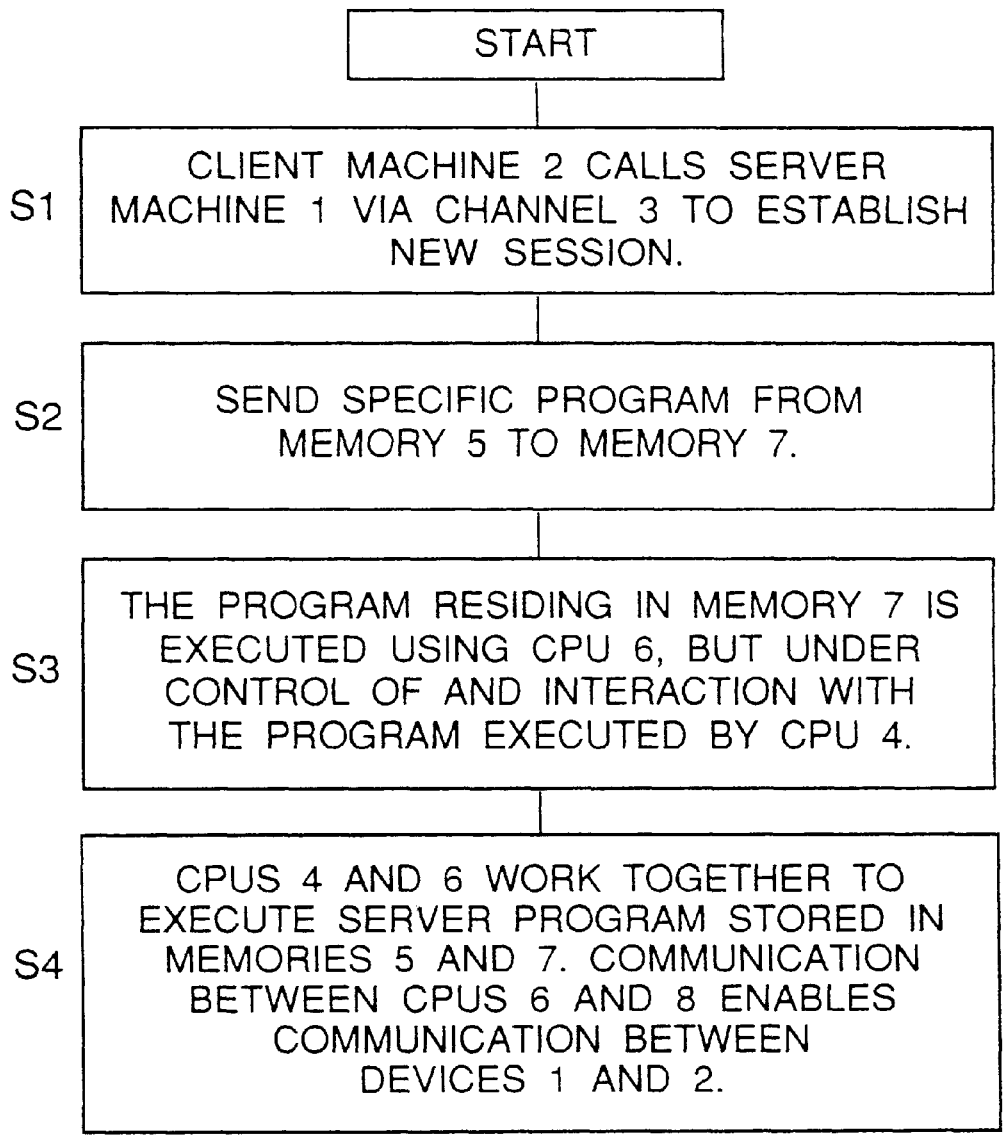
FIG. 2 is a flow chart used to describe the operation of a data security system according to the present invention.

FIG. 2 is a flow chart used to describe the start of a communications session between the server 1 and client 2 machines.

The process starts by the client machine 2 calling the server machine 1 via the communications channel 3 to open a new communications session (S1). When the server machine 1 is thus contacted, the server software causes the server machine 1 to send a specific program over the network (communications channel 3) into the first memory 7 of the client machine 2 (S2). Note that while this program is controlled by a CPU 8 in the client machine 2, program execution is divided between the CPU 4 in the server machine 1 and the other CPU 6 in the client machine 2. As a result, this program is managed by the control software of the client machine 2, but is executed under the operating control of the server software. The object of the client machine control program is to assure that the program received from the server machine 1 is executed according to the operating rules required for it to operate on the client machine 2. The processes executed by the CPU 4 and memory 5 of the server machine 1, and the processes executed by the CPU 6 and memory 7 of the client machine 2, work together to execute a single program.

The processes executed by the other CPU 8 and memory 9 of the client machine 2 communicate with the processes executed by the first CPU 6 and memory 7 of the client machine 2 via interface 10. This interface 10 is strictly controlled, and the operation of the server program executing in the hardware of the client machine 2 is also strictly controlled.

This control is achieved by the operating software, and the properties of the programming language used for this purpose. Java(™) (Sun Microsystems) is one example of such a programming language, while other languages with similar specific security features can also be used. Strict process separation can also be more easily assured by both physically and logically separating CPU 6 and memory 7 from CPU 8 and memory 9. It is therefore possible to provide the CPU 6 and memory 7 on a discrete, encapsulated plug-in card such as a PC Card(™) or standard PCMCIA card.

Part of the program generated by the server machine 1 is therefore executed by a CPU 6 and memory 7 in the client machine 2 by means of the present invention. Note that this program is a component of the process executed by the server machine 1. As a result, part of the server process is projected to the client machine 2 (S3). The two CPUs 4 and 6 thus work together to execute the server program stored partially in the server memory 5 and the client memory 7. Communication between the two client CPUs 6 and 8 enables communications during the communications process between the server machine 1 and client machine 2 (S4).

Figure 3:
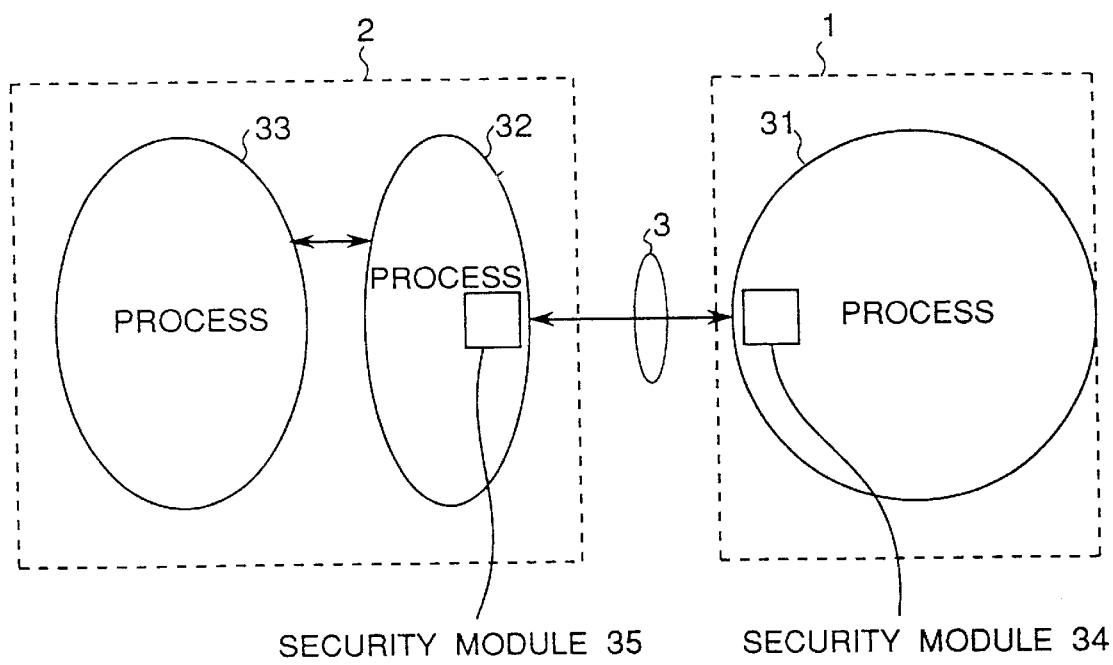
FIG. 3 is a conceptual diagram used to describe the operating principle of a data security system according to the present invention.

FIG. 3 is used to describe cooperative execution of a process by the server machine 1 and client machine 2. It is assumed below that process 32 is the program projected by the server machine 1 onto the process execution area of the client machine 2. Process 33 is a native process executed solely by the client machine 2. Processes 31 and 32 effectively operate as a single process executed while communicating via the communications channel 3.

Processes 32 and 33 operate interactively while communicating with each other under a strict control routine as described above. Processes 32 and 33 may also elicit input from the user using the hardware of the client machine 2. Depending on the specific hardware configuration, the client process 33 must also exchange messages with the client-server process 32 via the internal interface.

Processes 31 and 32 each also contain a respective security module 34, 35. These modules are specifically for encrypting and decrypting data passed over the communications channel 3. While encryption and decryption is accomplished in this embodiment in software accelerated by an application-specific integrated circuit (ASIC) machine incorporated in both the server machine 1 and client machine 2, it may also be executed entirely in software. These modules are also designed to share a known symmetric key code such as MISTY(™).

Figure 4:
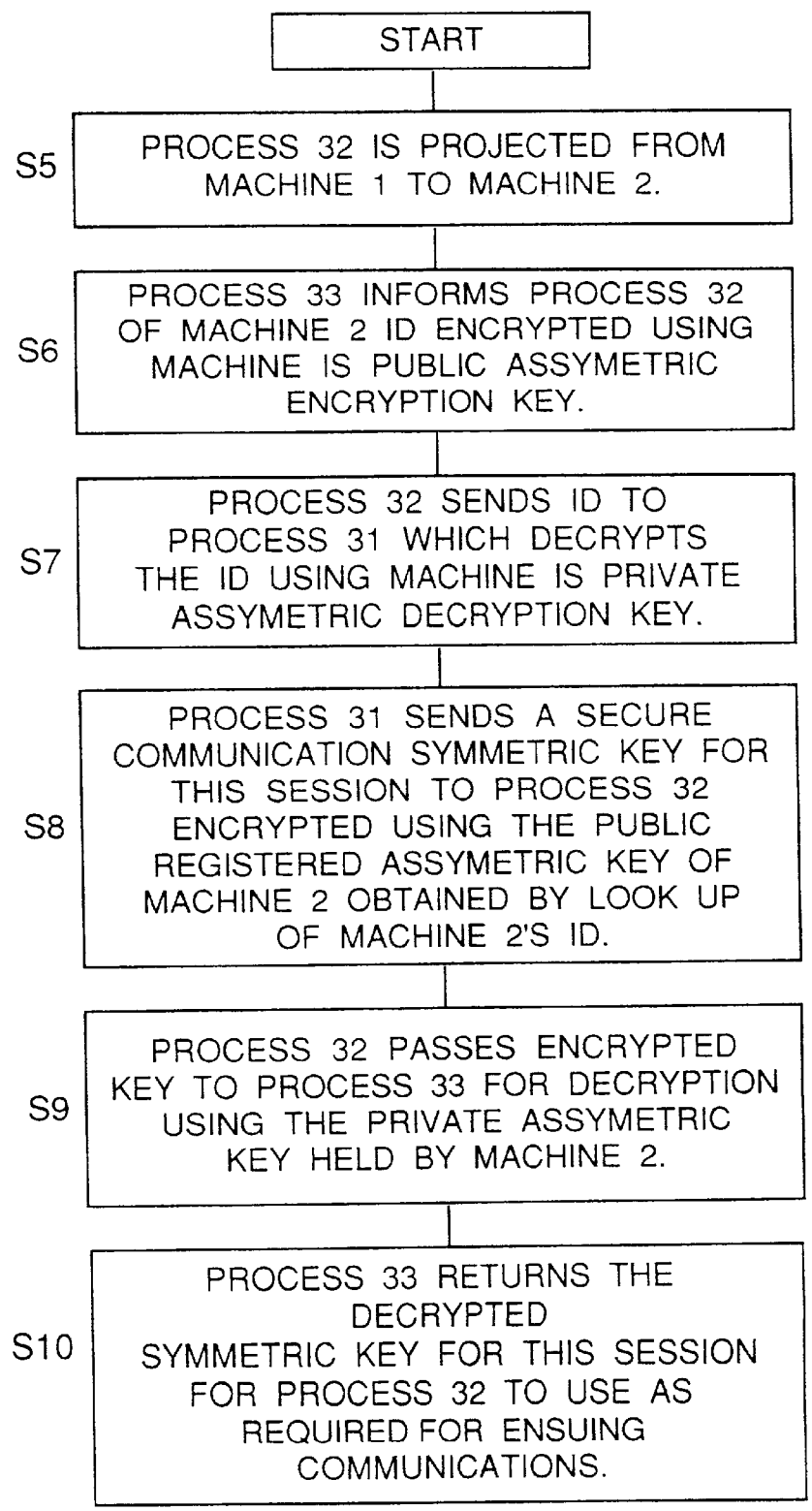
FIG. 4 is a flow chart used to describe a process further improving the security of a data security system according to the present invention.

FIG. 4 is a flow chart used to describe the execution of security-controlled processes. As described above, the client-server process 32 is projected from machine 1 to machine 2 for execution by the client machine 2 (S5). The client process 33 informs the client-server process 32 of the client machine 2 ID (S6), and the client-server process 32 forwards this information to the server process 31.

The ID for the client machine 2 is expressed as encrypted data using the public encryption key of the server machine 1, and is obtained when the client machine 2 signs on to access the server machine 1. Using this private asymmetric public encryption key, the server process 31 then decrypts the ID of the client machine 2 (S7). The server process 31 has previously looked up the asymmetric public encryption key of the client machine 2, which is stored in a public depository of certified copies of such keys. The server process 31 uses this public key to decrypt the symmetric encryption key sent by the server process 31 to the client-server process 32 for this session (S8).

The client-server process 32 passes the encrypted symmetric key to the client process 33 (S9), and the client process 33 decrypts the symmetric key information and returns the key to the client-server process 32 to enable decryption of all information passed between the server and client during this session (S10). It should be noted that this security procedure is just one example of the security procedures that may be used, and may vary from session to session or according to the server 1 accessed by the client machine 2. Because the client-server process 32 is, in fact, a projection from the server machine 1, the process can be dynamically changed by the server process 31, and this ability of the server machine 1 to dynamically change and control the process cooperatively executed by the server machine 1 and client machine 2 is a primary feature of the present invention. An object of the present invention is thus to improve data communications security by, for example, repeatedly modifying the security procedure under the control of the server machine.

Figure 5:
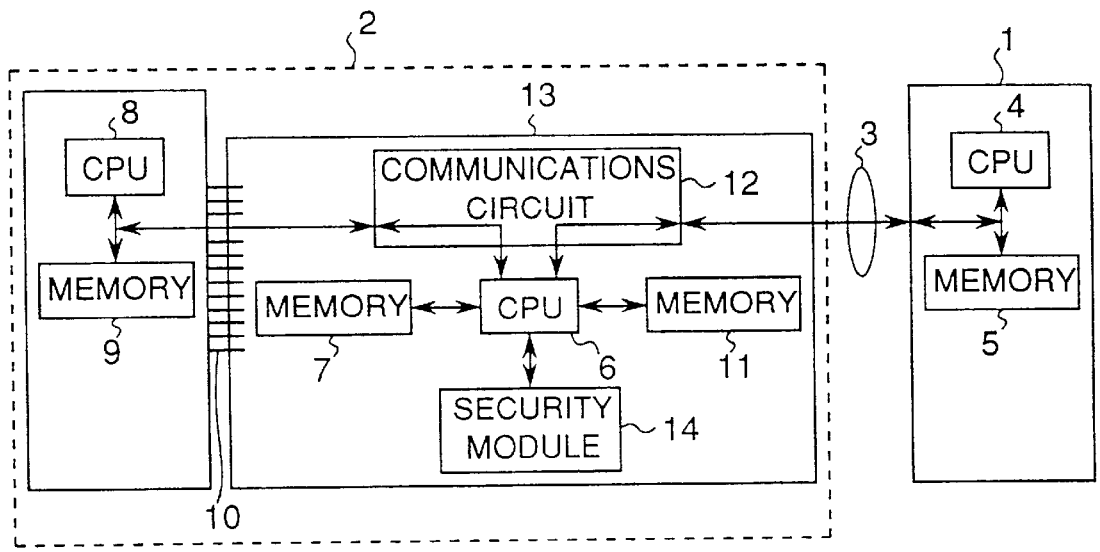
FIG. 5 is a block diagram of a second embodiment of a data security system according to the present invention.

FIG. 5 is a block diagram of an alternative embodiment of the present invention. The client machine 2 in this embodiment comprises an additional subsystem 13 containing the CPU 6 and memory 7. This subsystem 13 also contains a communications circuit 12, which may be the circuitry and components required for an ISDN connection, for example. This communications circuit 12 may also be used for a wide range of other communications services and connections, including analog telephone line connections, wireless communications connections, or a modem for LAN connections. While the CPU 6 may or may not be associated with these communications operations, an additional memory 11 separate from memory 7 is preferably provided to facilitate the processes associated with these functions.

The security module 14 used for the encryption and decryption processes is also contained within the subsystem 13 and connected to the CPU 6.

The entire subsystem 13 may also be encapsulated and connected to a machine using a standard communications bus, e.g., a standardized PCMCIA PC card bus.

Note that the alternative embodiment described above is identical to that of the first embodiment except that the processing power required to project the client-server process 32 from the server machine 1 to the client machine 2 and run the client-server process 32, and some or all of the processing power required to operate the communications circuit, can be distributed to the CPU 6.

Acceleration hardware in the form of a custom ASIC machine can be added to the subsystem to reduce the CPU power required for the encryption/decryption operations of the client-server process 32.

Figure 6:
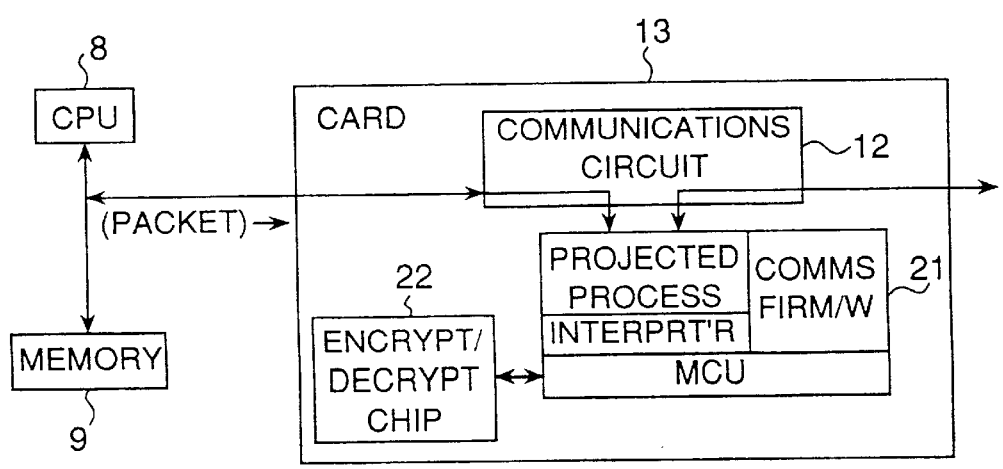
FIG. 6 is a block diagram of a card used in the client system.
Figure 7:
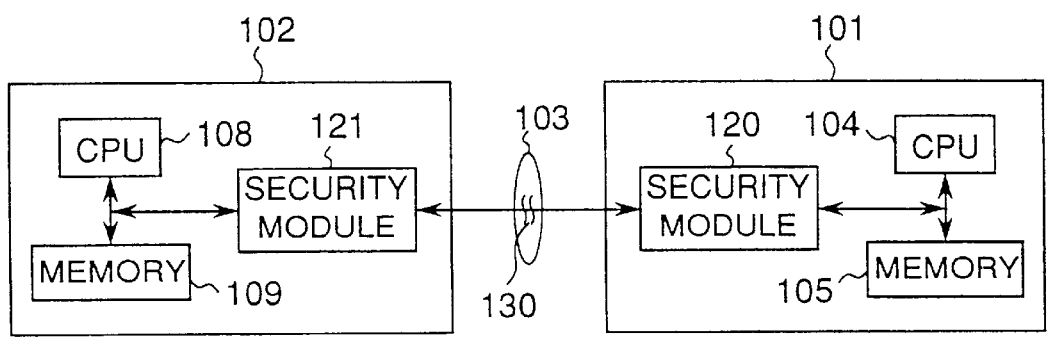
FIG. 7 is a block diagram of a data security system according to the prior art.

Referring to FIG. 6, an example of the subsystem 13 for use in the client system is shown in a form of a card. Provided in the card 13 are communications circuit 12, encrypt/decrypt chip 22 (corresponding to security module 14 shown in FIG. 5), and microcomputer 21 (corresponding to CPU 6, memories 7 and 11 in FIG. 5). Microcomputer 21 includes its own MCU, and has the function to receive and run the projected process from the server machine and to interpret the projected process.

According to one example, the card 13 is operated by the launching of applets written in a modified version of Sun Micros's JAVA (tm) programming language. These applets implement security methods and protocols between the main processes of the server and the projected processes of the servers processes running in the client device. By this arrangement, the channel security can be obtained with minimal client intervention.

The use of the JAVA (tm) language or JAVA like language is due to its inherent benefits such as platform independence, familiarity to programmers due to its likeness to C++, its multiple security features and its inherent inability to work with memory outside that which is allocated to it.

The "projected process" is the JAVA (tm) subset applet which comes over the communications network from the server machine as an extended part of the servers process and is executed via the interpreter in computer 21. The interpreter interacts with the application for the validation process and then controls the operations of the communications card in the communications session with the server machine. This is carried out by taking packets from the program running in CPU 8 and encrypting the packets for transmission. Also, the packets from the server machine are decrypted.

A data security system according to the present invention enhances communications channel security by not entrusting the encryption and decryption functions to separate processing machines. This system does not require the client machine to have and use different security software to access different server machines using different communications methods. Furthermore, individual communications packets are secure, and are not entrusted to a communications channel that may not be secure.

It is to be noted that instead of securing each data packet individually, the entire virtual communications channel can be made secure. This, for example, makes it easier to detect security attacks in which attempts to capture data in the channel are made.

Further, the client machines do not need to have different security software for different sessions types/communications methods, because the software originates in each case from the server machine. Also, different security software can be used per different session/server/communication method. This can be done without client intervention or pre-programming.

By the present invention, the client machine still needs to identify itself, but the client device is no longer involved in the mechanics of channel securing protocols as the client/server interface is moved within the client machine. By this arrangement, the server machine can control the actual session keys and protocols without allowing the client to see the process. This offers an additional level of security over and above the conventional security procedures.

According to the present invention, since the protocols are operated by transient processes running on a separate processor from the client main processor, and since these processes need never be completely present, capture of the protocols becomes extremely difficult.

Even if a protocol is somehow captured by a sophisticated impostor client who has illegally obtained keys to access the system, since the server machine may vary the protocols at will, the captured protocol is potentially (assuming the server implements changes of protocol per session) useless outside the current session and cannot be used to eavesdrop on conversations between the server machine and another client machine (or the same machine in a different session). This adds another layer of security, even if key security have become compromised in some way.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data security method for executing part of a server process, originated from a server machine, within a process execution space of a client machine, said method comprising the steps of:
    (a) assigning a process execution space in the client machine,
    (b) calling the server machine from the client machine,
    (c) transferring a program that is part of the server process from the server machine to said process execution space in the client machine, and
    (d) executing the program from the server machine in said process execution space in the client machine, such that a part of the server process is executed in said process execution space reserved in the client machine, and such that the server machine and part of the client machine cooperatively execute a process of the program.

2. A data security method according to claim 1, further comprising the steps of:
    (e) interfacing the client process with the server process in the client machine, and
    (f) communicating between the client process and server process.

3. A data security method according to claim 1, wherein said client machine encrypts and decrypts data using encryption and decryption information contained in the program transferred from the server machine.

4. A data security method according to claim 2, wherein said client machine comprises an application-specific integrated circuit unit to execute at least a part of the encryption and decryption process under the control of the program transferred from the server.

5. A data security system for executing a process of a server machine within a process execution space of a client machine, said system comprising:
    (1) a server machine comprising:
        (a) a first CPU; and
        (b) a first memory;
    (2) a client machine comprising:
        (a) a second CPU;
        (b) a second memory;
        (c) a third CPU; and
        (d) a third memory;
    (3) first communication means provided between the server machine and the client machine for communicating between the first CPU associated with the first memory and the third CPU associated with the third memory, and for loading a program from the first memory to the third memory for execution by the third CPU;
    (4) second communication means provided in the client machine for communicating between said second CPU and third CPU; and
    (5) means for preventing interaction between the second and third memories except when controlled by the program being executed by the client system.

6. A data security system according to claim 5 wherein said client machine comprises a primary machine portion comprising said second CPU and said second memory, and a connectable machine portion comprising said third CPU and third memory.

7. A data security system according to claim 6, wherein said connectable machine portion further comprises a communication circuit.

8. A data security system according to claim 6, wherein said connectable machine portion is implemented in a card.

9. A data security system according to claim 8, wherein said card comprises a printed circuit board.

10. A data security system according to claim 7, wherein said connectable machine portion is implemented in a card.

11. A data security system according to claim 10, wherein said card comprises a printed circuit board.

12. A data security system according to claim 6, wherein said connectable machine portion further comprises an encryption/decryption circuit.

13. A data security system according to claim 5, wherein said second CPU and third CPU are provided by a single CPU in a time sharing manner.

14. A data security method according to claim 1, further comprising the step of:
    dynamically changing the process cooperatively executed by the server machine and part of the client machine.

15. A data security method according to claim 14, wherein the process is a security procedure,
    said dynamically changing step repeatedly modifying the security procedure under control of the server machine.

16. A data security system according to claim 5,
    wherein said first CPU and said third CPU cooperatively execute a process within the program.

17. A data security system according to claim 16, said server machine further comprising:
    means for dynamically changing the process cooperatively executed by said first CPU and said third CPU.

18. A data security system according to claim 17, wherein the process is a security procedure,
    said dynamically changing means repeatedly modifying the security procedure under control of the server machine.

19. A data security system for executing a process of a server machine within a process execution space of a client machine, said system comprising:
    a server machine including
        a first CPU, and
        a first memory;
    a client machine including
        a second CPU,
        a second memory,
        a third CPU, and
        a third memory;
    a first communication channel operatively connecting said client machine and said server machine;
    said server machine utilizing said first communication channel to load a portion of a security program from said first memory to said third memory;
    said server machine and said client machine cooperatively executing the security program with said first CPU and said third CPU such that the security program is managed by the client machine and executed under operative control of said server machine;

a second communication channel in said client machine, said second communication channel operatively connecting said second CPU and said third CPU; and a security device operatively connected to said second and third memories, said security device preventing interaction between said second and third memories except when controlled by the security program being cooperatively executed by said server machine and said client machine.

20. A data security system according to claim 19, said server machine dynamically changing the security program cooperatively executed by said first CPU and said third CPU.

21. A data security system according to claim 20, said server machine repeatedly modifying the security program cooperatively executed by said first CPU and said third CPU.

22. A data security system according to claim 19, said client machine comprising a primary machine portion including said second CPU and said second memory and a connectable machine portion including said third CPU and said third memory.

23. A data security system according to claim 22, wherein said connectable machine portion further includes a communication circuit.

24. A data security system according to claim 22, wherein said connectable machine portion is implemented in a card.

25. A data security system according to claim 24, wherein said card comprises a printed circuit board.

26. A data security system according to claim 22, wherein said connectable machine portion further comprises an encryption/decryption circuit.

27. A data security system according to claim 19, wherein said second CPU and said third CPU are provided by a single CPU in a time sharing manner.

* * * * *